US009423276B2

(12) United States Patent
Ogasawara (10) Patent No.: US 9,423,276 B2
(45) Date of Patent: Aug. 23, 2016

(54) MEASUREMENT APPARATUS, MEASUREMENT METHOD, AND ABSOLUTE ENCODER (71) Applicant: CANON KABUSHIKI KAISHA, Tokyo (JP)

(72) Inventor: Makiko Ogasawara, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 485 days.

(21) Appl. No.: 14/073,348

(22) Filed: Nov. 6, 2013

(65) Prior Publication Data

US 2014/0136144 A1 May 15, 2014

(30) Foreign Application Priority Data

Nov. 15, 2012 (JP) ................... 2012-251501

(51) Int. Cl.
G06F 11/00 (2006.01)
G01D 5/26 (2006.01)
G01D 5/347 (2006.01)
G01D 5/245 (2006.01)

(52) U.S. Cl.
CPC ............... G01D 5/26 (2013.01); G01D 5/2455 (2013.01); G01D 5/34792 (2013.01)

(58) Field of Classification Search
CPC .... H04B 10/116; G01S 5/16; B65H 2220/03; H04N 2201/0471
USPC .......... 702/150, 155, 182–185, 188
See application file for complete search history.

(56) References Cited

U.S. PATENT DOCUMENTS

2010/0231513 A1* 9/2010 Deliwala ................. G01S 3/783
345/158
2012/0162633 A1* 6/2012 Roberts ...................... G01S 5/16
356/5.09
2012/0232836 A1* 9/2012 Ohmi ..................... G06F 3/0304
702/150

FOREIGN PATENT DOCUMENTS

JP 2004-529344 A 9/2004
WO 02/084223 A1 10/2002

* cited by examiner

Primary Examiner — Edward Raymond
(74) Attorney, Agent, or Firm — Rossi, Kimms & McDowell LLP (57) ABSTRACT A measurement apparatus includes: a detector which detects modulated light from the target object and outputs a periodic pattern signal; and a calculation unit which determines positions of two extreme values from the signal output from the detector, calculates a first total sum by multiplying the signal by first reference data in a region between the positions of the two extreme values, and adding the multiplication results, calculates a second total sum by multiplying the signal by second reference data with a phase difference of 90° with respect to the first reference data in the region, and adding the multiplication results, calculates a phase of the signal based on the first and second total sums, and calculates the position of the target object based on the calculated phase.

6 Claims, 10 Drawing Sheets

MEASUREMENT APPARATUS, MEASUREMENT METHOD, AND ABSOLUTE ENCODER

BACKGROUND OF THE INVENTION

1. Field of the Invention

The present invention relates to a measurement apparatus, a measurement method, and an absolute encoder.

2. Description of the Related Art

Conventionally, an incremental encoder or absolute encoder has been used to measure a position and angle. Incremental encoders record a grating of a given period in a scale or disk, optically or magnetically read the movement of the grating, and calculate an absolute position in combination with an origin detection mechanism. In recent years, there have also been high-resolution products, each of which has a grating pitch decreased to about 80 µm and interpolates phase information within one pitch by dividing it into about 10,000 sections using an electrical divider. Also, since recent incremental encoders read grating lines by optically averaging them instead of reading the grating lines one by one, a pattern error of the grating itself is canceled, resulting in high accuracy. Since, however, the incremental encoders cannot obtain absolute position information unless the origin is initially detected, applications particularly to the fields of machine tools and robots are limited.

On the other hand, absolute encoders can output absolute position information instantly by reading a binary pattern such as a gray code or M-sequence code as an image using a light-receiving element array or an image sensor such as a CCD. Japanese Patent Laid-Open No. 2004-529344 discloses a coding method as an absolute coding method. In Japanese Patent Laid-Open No. 2004-529344, an absolute code is embedded by, for example, removing, among the reflective gratings and non-reflective gratings of an incremental encoder, some reflective gratings, and a code and phase information are calculated using image information (pattern boundary information) from a light-receiving element array.

In Japanese Patent Laid-Open No. 2004-529344, however, an absolute code and interpolation phase information are calculated by a pattern matching (correlation calculation) method of shifting (laterally shifting) the phases of an image and reference table data by paying attention to the boundary position of a density pattern. In Japanese Patent Laid-Open No. 2004-529344, therefore, the resolution is basically limited by the precision of an imaging optical system and a light-receiving element array. Furthermore, in Japanese Patent Laid-Open No. 2004-529344, a large-scale calculation electronic circuit for image processing is required, and it takes time to calculate absolute position information due to complicated calculation.

SUMMARY OF THE INVENTION

To solve the aforementioned problems, the present invention provides a measurement apparatus and a measurement method which achieve both high measurement accuracy and high measurement speed.

The present invention in the first aspect provides a measurement apparatus of measuring a position of a target object, the apparatus comprising: a detector configured to detect modulated light from the target object having a periodic pattern, and to output a periodic pattern signal with at least two periods; and a calculation unit configured to calculate the position of the target object based on the output of the detector, wherein the calculation unit determines positions of two extreme values each of which appears as a constant value for each period of the periodic pattern from the periodic pattern signal output from the detector, calculates a first total sum by multiplying the periodic pattern signal by first reference waveform data of a sinusoidal waveform with the same period as that of the periodic pattern signal in a region between the positions of the two extreme values, and adding the multiplication results, calculates a second total sum by multiplying the periodic pattern signal by second reference waveform data of a sinusoidal waveform with a phase difference of 90° with respect to the first reference waveform data in the region, and adding the multiplication results, calculates a phase of the periodic pattern signal based on the first total sum and the second total sum, and calculates the position of the target object based on the calculated phase.

The present invention in the second aspect provides an absolute encoder, the encoder comprising: a scale in which a plurality of marks including at least two different types of marks are arrayed at a constant period in a first direction; and a measurement apparatus configured to measure a position of the scale, the measurement apparatus comprising: a detector configured to detect modulated light from at least two of the plurality of marks, and to output a periodic pattern signal with at least two periods; and a calculation unit configured to calculate an absolute position of the scale in the first direction with respect to the detector based on the output of the detector, wherein the calculation unit determines positions of two extreme values each of which appears as a constant value for each period of the periodic pattern from the periodic pattern signal output from the detector, calculates a first total sum by multiplying the periodic pattern signal by first reference waveform data of a sinusoidal waveform with the same period as that of the periodic pattern signal in a region between the positions of the two extreme values, and adding the multiplication results, calculates a second total sum by multiplying the periodic pattern signal by second reference waveform data of a sinusoidal waveform with a phase difference of 90° with respect to the first reference waveform data in the region, and adding the multiplication results, calculates a phase of the periodic pattern signal based on the first total sum and the second total sum, and calculates the absolute position of the scale in the first direction based on the calculated phase.

The present invention in the third aspect provides a measurement method of measuring a position of a target object, the method comprising: detecting a modulated light from the target object having a periodic pattern, and obtaining a periodic pattern signal with at least two periods; determining positions of two extreme values each of which appears as a constant value for each period of the periodic pattern for the obtained periodic pattern signal; calculating a first total sum by multiplying the periodic pattern signal by first reference waveform data of a sinusoidal waveform with the same period as that of the periodic pattern signal in a region between the positions of the two extreme values, and adding the multiplication results; calculating a second total sum by multiplying the periodic pattern signal by second reference waveform data of a sinusoidal waveform with a phase difference of 90° with respect to the first reference waveform data in the region, and adding the multiplication results; calculating a phase of the periodic pattern signal based on the first total sum and the second total sum; and calculating the position of the target object based on the calculated phase.

Further features of the present invention will become apparent from the following description of exemplary embodiments with reference to the attached drawings.

DESCRIPTION OF THE EMBODIMENTS

Embodiments of the present invention will be described in detail below with reference to the accompanying drawings.

First Embodiment

Figure 1:
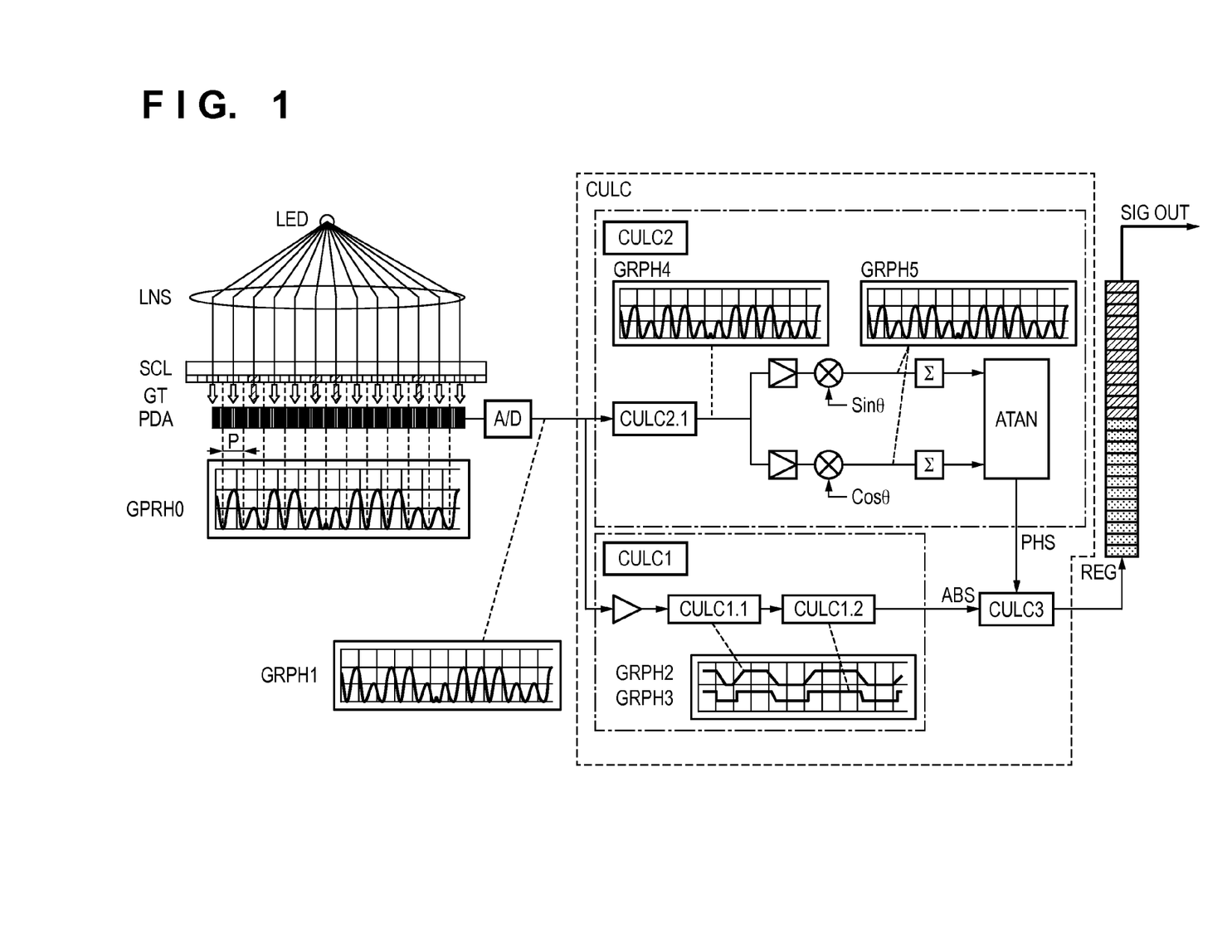
FIG. 1 a view showing a transmissive absolute encoder.

FIG. 1 is a view showing a transmissive slit type absolute encoder according to the first embodiment of the present invention, and illustrates the arrangement of a head unit and the procedure of signal processing in a signal processing unit. As shown in FIG. 1, the absolute encoder includes a light-emitting element LED, a collimator lens LNS, a scale SCL, a light-receiving element array PDA, and a signal processing unit CULC. The light-emitting element LED emits measurement light toward the scale SCL. The collimator lens LNS converts the measurement light into parallel light. A grating GT obtained by assigning grayscale information to an incremental pattern is formed in the scale SCL. On the grating GT of the scale SCL, a plurality of marks including at least two different types of marks are arrayed at given periods in a first direction. The scale SCL forms a target object, the position of which is to be measured.

The light-receiving element array PDA receives projection light (modulated light) from the scale SCL which has been modulated when passing through the scale SCL. The light-receiving element array PDA forms a detector for detecting the modulated light from the scale SCL and outputting a periodic pattern signal with at least two periods. The signal processing unit CULC processes an output signal of the light-receiving element array PDA, and outputs position information. The signal processing unit CULC forms a calculation unit for calculating the position of the target object.

Figure 2:
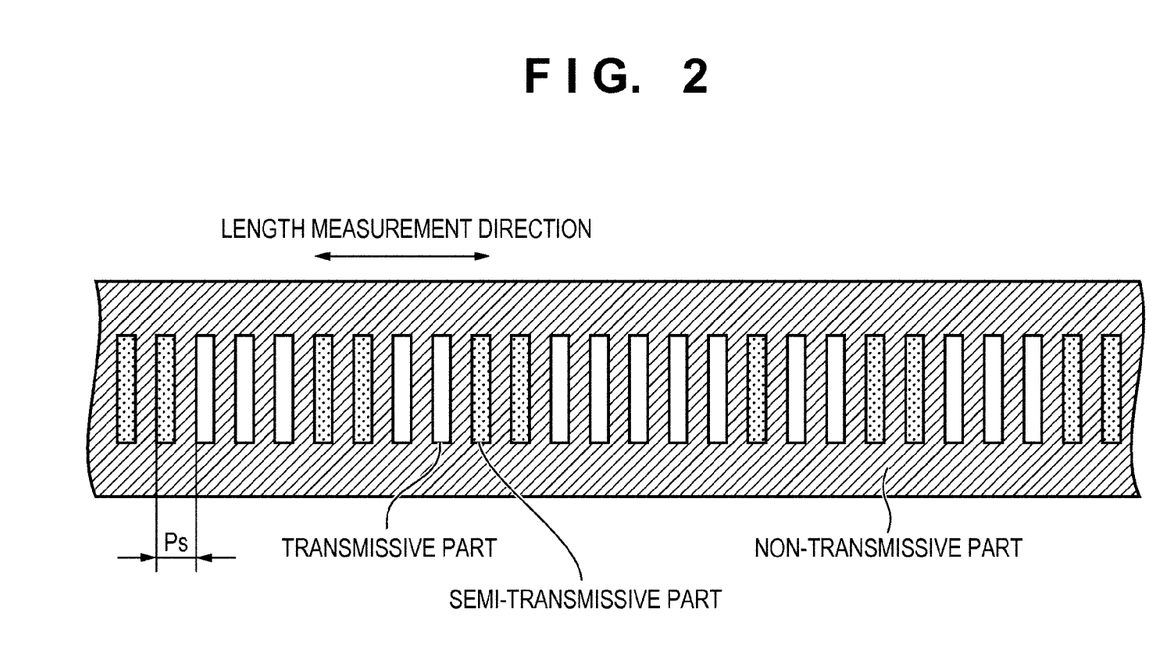
FIG. 2 is a view showing a scale.

The scale SCL is movable relative to the arrayed direction of the light-receiving element array PDA. The absolute encoder measures the position of the scale SCL with respect to the light-receiving element array PDA. As shown in FIG. 2, the scale SCL forms an incremental pattern having a pitch P by non-transmissive slits, and embeds absolute codes 1 and 0 between the non-transmissive slits by a transmissive slit and semi-transmissive slit, respectively. The light-receiving element array PDA is configured to be divided into N sections for one "bright-dark" cycle, and to shift phases output from the light-receiving element array PDA by equal intervals.

Referring to FIG. 1, assume that the number M of bits of the absolute code is set to 11, the division number N of a density signal of the light-receiving element array PDA is set to 12, and the number of channels of the light-receiving element array PDA is set to $N \times (M+\alpha) = 144$. Note that $\alpha$ indicates the number of elements adjacent to light-receiving elements, which are used for position detection to attain reliable determination of the absolute code. In this embodiment, $\alpha=1$. This causes the scale SCL to project a sinusoidal periodic pattern signal onto the light-receiving element array PDA, thereby always obtaining a periodic pattern signal from the light-receiving element array PDA. GRPH0 indicates the density distribution of incident light on the light-receiving element array PDA. GRPH1 shown in FIG. 1 indicates a signal waveform obtained by temporarily storing a plurality of periodic pattern signals output from the light-receiving element array PDA in a register, and serially transferring them by using a clock signal as a trigger. Based on the signal waveform GRPH1 serially transferred from the light-receiving element array PDA, an integer part calculation unit CULC1 calculates an absolute code (integer part) and a phase calculation unit CULC2 calculates a phase. A position calculation unit CULC3 combines the absolute code and phase into an absolute position, and outputs it as position information.

The integer part calculation unit CULC1 performs two processes including moving-average processing CULC1.1 and binarization and integer part calculation processing CULC1.2. The integer part calculation unit CULC1 performs moving-average processing CULC1.1 to obtain the moving average of data obtained from the light-receiving element array PDA using data for one period of a density pattern. If the data indicate an ideal sinusoidal wave, data indicated by GRPH2 shown in FIG. 1 are obtained. The integer part calculation unit CULC1 executes the binarization and integer part calculation processing CULC1.2 to perform binarization by a threshold, thereby generating data indicated by GRPH3. The integer part calculation unit CULC1 can obtain the code of an integer part by obtaining each density period from the data GRPH3.

EXAMPLE 1

Figure 3A:
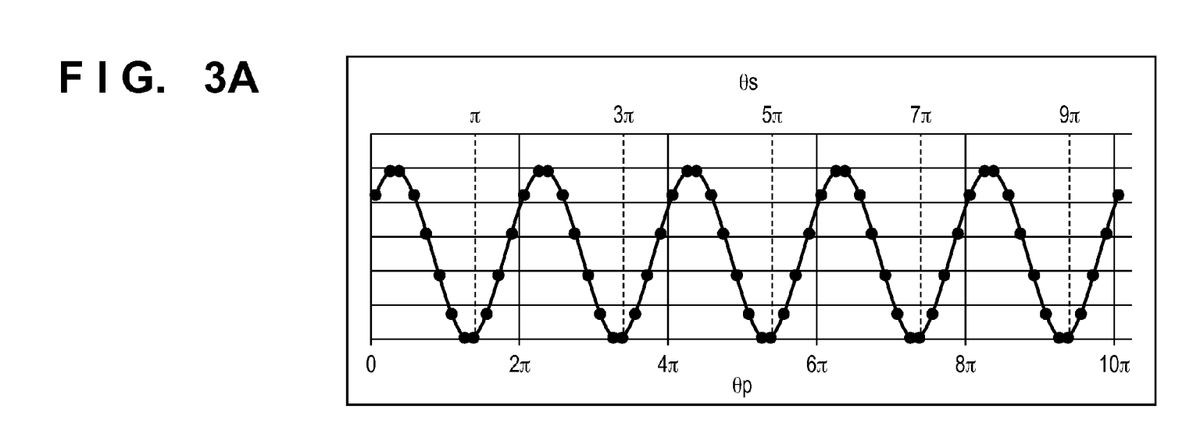
FIGS. 3A and 3B are graphs each showing a periodic signal.

A phase calculation unit CULC2 will be described in detail below. The phase calculation unit CULC2 performs two processes including data extraction processing CULC2.1 and phase calculation processing CULC2.2. The principle of the phase calculation processing CULC2.2 will be briefly explained using a model in which a light-receiving element array has a length of 5 bits. Let $\theta s$ be a phase defining the period of a density signal, and $\theta p$ be a phase defined by the light-receiving element array. The periods of the two phases coincide with each other, and have a relationship "phase information $PHS = \theta s - \theta p$". If, for example, the light-receiving element array has a length of 5 bits, a periodic pattern signal Ir obtained from the light-receiving element array is as shown in FIG. 3A, as given by:

$$Ir = (\tfrac{1}{2})\{\cos(\theta s) + 1\} = (\tfrac{1}{2})\{\cos(\theta p + PHS) + 1\} \qquad (1)$$

where $PHS < \theta s < 5 \times 2\pi + PHS$ and $0 < \theta p < 5 \times 2\pi$

First sinusoidal reference waveform data Sa and second reference waveform data Sb having a phase difference of 90° with respect to the first reference waveform data Sa are defined by:

$$Sa = \sin\theta p$$

$$Sb = \cos\theta p \qquad (2)$$

A first total sum A and second total sum B are obtained by multiplying the periodic pattern signal Ir by the first reference waveform data Sa and second reference waveform data Sb, and integrating the multiplication results, respectively, as given by:

$$A = \int_0^{10\pi} Ir * Sa \, d\theta_p \qquad (3)$$

$$= \int_0^{10\pi} (1/2)\{\cos(\theta_p + PHS) + 1\}\sin\theta_p \, d\theta_p$$

$$= (5/2)\int_0^{2\pi}[(1/2)\{\sin(2\theta_p + PHS) - \sin(PHS)\} + \sin\theta_p]d\theta_p$$

$$= (5/2)[-\cos\theta_p - (1/2)\theta_p\sin(PHS) - (1/2)\cos(2\theta_p + PHS)]_0^{2\pi}$$

$$= -(5\pi/2)\sin(PHS)$$

$$B = \int_0^{10\pi} Ir * Sb \, d\theta_p$$

$$= \int_0^{10\pi} (1/2)\{\cos(\theta_p + PHS) + 1\}\cos\theta_p \, d\theta_p$$

$$= (5/2)\int_0^{2\pi}[(1/2)\{\cos(2\theta_p + PHS) + \cos(PHS)\} + \cos\theta_p]d\theta_p$$

$$= (5/2)[\sin\theta_p + (1/2)\theta_p\cos(PHS) + (1/2)\sin(2\theta_p + PHS)]_0^{2\pi}$$

$$= (5\pi/2)\cos(PHS)$$

It is possible to calculate the phase information PHS by performing arc tangent calculation for a value obtained by dividing the first total sum A by the second total sum B, as given by:

$$\tan^{-1}(-A/B) = \tan^{-1}\{(5\pi/2)\sin(PHS)/(5\pi/2)\cos(PHS)\} = PHS \qquad (4)$$

As is apparent from equations (3), irrespective of the value of the phase information PHS, the total sums A and B are represented by sin(PHS) and cos(PHS) multiplied by a common coefficient, respectively, and thus it is possible to correctly calculate the phase information PHS by arc tangent calculation. For the phase information PHS, the periodicity of the original periodic pattern signal is ensured. Assuming that the range of integration corresponds to i periods (i is a natural number), therefore, even if $\beta < \theta_p < 2i\pi + \beta$, the total sums A and B having the common coefficient can be obtained, thereby calculating the phase information PHS with high accuracy.

Figure 3B:
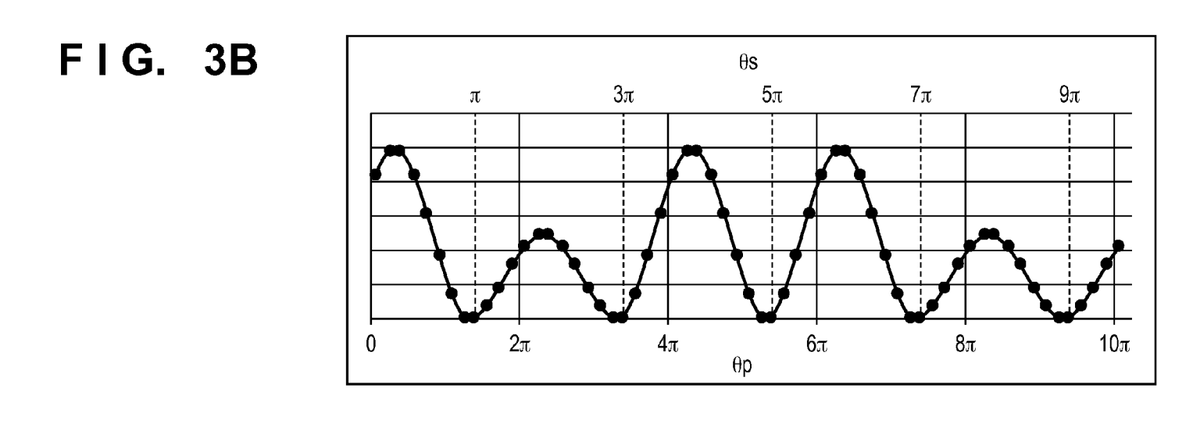

A waveform when gray levels are assigned to the periodic pattern signal Ir and the light-receiving element array has a length of 5 bits will be described next. Let $a_m$ be the mth amplitude of the periodic pattern signal. Then, the periodic pattern signal Ir is defined by:

$$Ir = a_0 * (1/2)\{\cos(\theta_{s0}) + 1\} + \qquad (5)$$

$$\sum_{m=1}^{4} a_m * (1/2)\{\cos(\theta_{sm}) + 1\} + a_5 * (1/2)\{\cos(\theta_{s5}) + 1\}$$

where $PHS < \theta_{s0} < \pi$, $(2m-1)\pi < \theta_{sm} < (2(m+1)-1)\pi$, $9\pi < \theta_{se} < 10\pi + PHS$ $$Ir = a_0 * (1/2)\{\cos(\theta_{p0} + PHS) + 1\} +$$

$$\sum_{m=1}^{4} a_m * (1/2)\{\cos(\theta_p + PHS) + 1\} +$$

$$a_5 * (1/2)\{\cos(\theta_{p0} + PHS) + 1\}$$

where $0 < \theta_{p0} < \pi - PHS$, $(2m-1)\pi - PHS < \theta_{pm} < (2(m+1)-1)\pi - PHS$, $9\pi - PHS < \theta_{pe} < 10\pi$ FIG. 3B shows an example of the periodic pattern signal Ir assigned with gray levels.

As described above, first and second total sums are obtained by multiplying the periodic pattern signal Ir assigned with gray levels by the first reference waveform data Sa and second reference waveform data Sb, respectively, as given by:

$$A = \int_0^{10\pi} Ir * Sa \, d\theta_p \qquad (6)$$

$$= (-a_0/8)[4\cos\theta_p + 2\theta_p\sin(PHS) + \cos(2\theta_p + PHS)]_0^{\pi-PHS} -$$

$$\sum_{m=1}^{4}(a_m/8)[4\cos\theta_p + 2\theta_p\sin(PHS) + \cos(2\theta_p + PHS)]_{(m-1)\pi-PHS}^{(m+1)\pi-PHS} -$$

$$(a_5/8)[4\cos\theta_p + 2\theta_p\sin(PHS) + \cos(2\theta_p + PHS)]_{9\pi-PHS}^{10\pi}$$

$$= (a_0/2)\{1 + 2\cos(PHS) - (1/2)(\pi - PHS)\sin(PHS)\} -$$

$$(\pi/2)\sum_{m=1}^{4} a_m * \sin(PHS) - (a_5/2)\left\{\begin{array}{l}1 + \cos(PHS) + \\ (1/2)(\pi + PHS)\sin(PHS)\end{array}\right\}$$

$$B = \int_0^{10\pi} Ir * Sb \, d\theta_p$$

$$= (a_0/8)[4\sin\theta_p + 2\theta_p\cos(PHS) + \sin(2\theta_p + PHS)]_0^{\pi-PHS} +$$

$$\sum_{m=1}^{4}(a_m/8)[4\sin\theta_p + 2\theta_p\cos(PHS) + \sin(2\theta_p + PHS)]_{(m-1)\pi-PHS}^{(m+1)\pi-PHS} +$$

$$(a_5/8)[4\sin\theta_p + 2\theta_p\cos(PHS) + \sin(2\theta_p + PHS)]_{9\pi-PHS}^{10\pi}$$

$$= (a_0/4)\{(\pi - PHS)\cos(PHS) + \sin(PHS)\} +$$

$$(\pi/2)\sum_{m=1}^{4} a_m * \cos(PHS) + (a_5/4)\{(\pi + PHS)\cos(PHS) - \sin(PHS)\}$$

In addition to sin(PHS) and cos(PHS) of the second terms, Equations (6) include the first and third terms for a waveform, not all periods of which fall within the light-receiving element array. If an amplitude $a_0 = a_5$, the same total sums A and B as those represented by equations (3) can be obtained by adding the first and third terms, respectively, and the phase information PHS can be calculated by arc tangent calculation. If $a_0 \ne a_5$, the first and third terms are not eliminated, and it is thus impossible to calculate the phase information PHS with high accuracy even by performing arc tangent calculation.

To solve this problem, the range of integration is changed so that equations (6) have only the second terms, respectively. To do this, the range of integration need only be set to $\pi - PHS < \theta_p < 9\pi - PHS$ instead of $0 < \theta_p < 10\pi$.

$$A = \int_{\pi-PHS}^{9\pi-PHS} It * Sa \, d\theta_p = (-\pi/2)\sum_{m=1}^{4} a_m * \sin(PHS) \qquad (7)$$

$$B = \int_{\pi-PHS}^{9\pi-PHS} Ir * Sb \, d\theta_p = (\pi/2)\sum_{m=1}^{4} a_m * \cos(PHS)$$

It is possible to calculate the phase information PHS with high accuracy for the periodic pattern signal assigned with gray levels by performing arc tangent calculation given by equation (4) using the thus obtained total sums A and B given by equations (7). As is apparent from equations (5), the new integration range corresponds to a data range of i periods including the overall waveform within a region between the positions of the local minimum points of the periodic pattern signal Ir with all periods (modulation information) obtained from the light-receiving elements. The positions of the local minimum points of the modulation information indicate the center positions of scale board parts (non-transmissive parts in this embodiment) between the transmissive parts and semi-transmissive parts of a periodic pattern formed on a scale board. A local minimum value is an extreme value which appears as a constant value for each period of the periodic pattern formed by the transmissive parts and semi-transmissive parts in the periodic pattern signal Ir with all periods.

Figure 4:
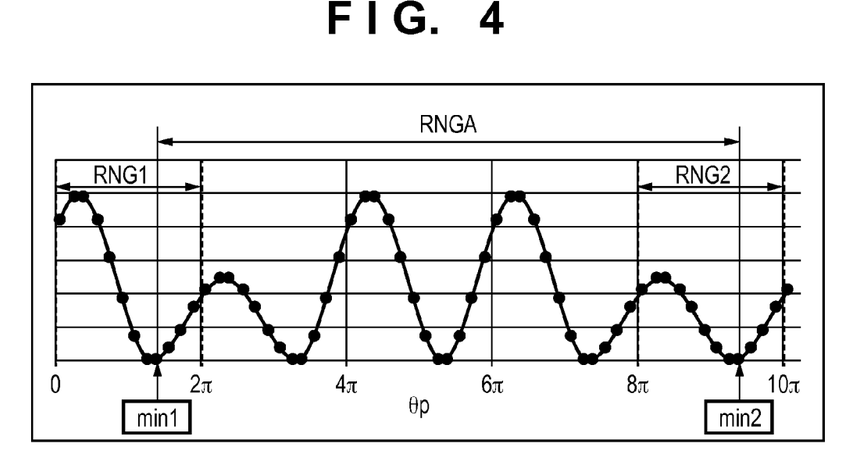
FIG. 4 is a graph showing a data range used for calculation.
Figure 5:
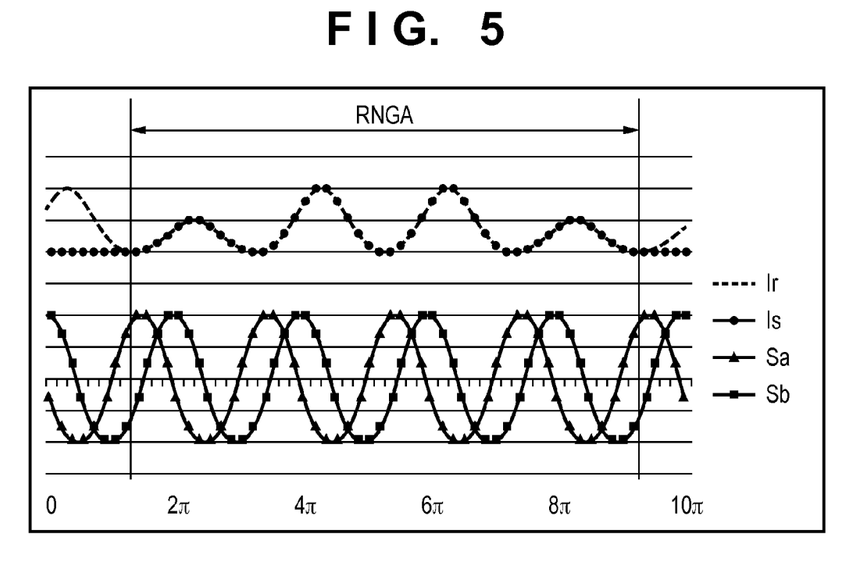
FIG. 5 is a graph showing a data range according to Example 1.

The data extraction processing CULC2.1 will now be described. In this processing, the periodic pattern signal Ir obtained from the light-receiving element array is converted into data Is of i periods between the positions of the local minimum points. As described above, it is possible to calculate the phase information PHS with high accuracy by multiplying the data Is of i periods between the positions of the local minimum points of the modulation information by the first and second reference waveform data and integrating the multiplication results, respectively. As shown in FIG. 4, a first region (RNG1) indicates a region where the position of one local minimum point of the modulation information is searched for, and a second region (RNG2) indicates a region where the position of the other local minimum point of the modulation information is searched for. Data are compared within each region, positions min1 and min2 of the two local minimum points of the modulation information are determined, thereby determining a region (RNGA) between the positions min1 and min2. Any part of the periodic pattern signal Ir may be used as the first region RNG1 or the second region RNG2 where the position of a local minimum point of the modulation information is searched for as long as two conditions, that is, (1) the region RNGA corresponds to one or more periods of the density signal and (2) it is possible to determine a local minimum point of the modulation information are satisfied. If the phases of the regions RNG1 and RGN2 coincide with each other, it is not necessary to determine the position of a local minimum point in each region. Instead, the position min1 of the local minimum point in the region RNG1 or the position min2 of the local minimum point in the region RNG2 may be determined, and then data for i periods from the determined position of the local minimum point may be set as data of the region RNGA. If the region RNGA is determined, the data of the region RNGA of the signal Ir are held intact, and data of a region other than the region RNGA are set to 0, thereby holding the thus obtained data as new data Is (FIG. 5).

It is possible to obtain total sums A and B by multiplying the data Is by the first reference waveform data Sa and second reference waveform data Sb, and integrating the results, respectively, and then obtain the phase information PHS using the total sums A and B, as given by:

$$A = \int_0^{10\pi} Is * Sa d\theta_p = (-\pi/2)\sin(PHS) * \sum_{m=1}^{4} a_m \quad (8)$$

$$B = \int_0^{10\pi} Is * Sb d\theta_p = (\pi/2)\cos(PHS) * \sum_{m=1}^{4} a_m$$

$$\tan^{-1}(A/B) = \tan^{-1}\left\{(-\pi/2)\sin(PHS) * \sum_{m=1}^{4} a_m\right\} / \{(\pi/2)\cos)PHS\} *$$

-continued $$\left.\sum_{m=1}^{4} a_m\right\} = PHS$$

As described above, it is possible to calculate the phase information PHS with high accuracy without normalizing the amplitude by performing phase calculation within the range of the region RNGA for the periodic pattern signal assigned with gray levels. If the region RNGA corresponds to i periods (i is a natural number), this method is applicable regardless of the number of bits of the absolute code.

The method using integration has been described above. In fact, however, calculation is performed using discrete data from the light-receiving element array PDA. Therefore, the position of a local minimum point of the modulation information of a continuous density signal does not always coincide with the position of a local minimum point of the signal Ir obtained from the discrete light-receiving element array PDA. Let β be the shift between the position of the local minimum point of the modulation information of the density signal and the position of the local minimum point of the signal Ir. Then, we have:

$$A = \int_{\pi-PHS-\beta}^{9\pi-PHS-\beta} Ir * Sa d\theta_p \quad (9)$$

$$= (a_0/2)\left[\begin{matrix}-\cos\theta_p - (1/2)\theta_p\sin(PHS) - \\ (1/2)\cos(2\theta_p + PHS)\end{matrix}\right]_{\pi-PHS-\beta}^{\pi-PHS} +$$

$$(1/2)\sum_{m=1}^{3} a_m \left[\begin{matrix}-\cos\theta_p - (1/2)\theta_p\sin(PHS) - \\ (1/2)\cos(2\theta_p + PHS)\end{matrix}\right]_{(m-1)\pi-PHS}^{(m+1)\pi-PHS} +$$

$$(a_4/2)\left[\begin{matrix}-\cos\theta_p - (1/2)\theta_p\sin(PHS) - \\ (1/2)\cos(2\theta_p + PHS)\end{matrix}\right]_{7\pi-PHS}^{9\pi-PHS-\beta}$$

$$= (a_0/8)\left\{\begin{matrix}3\cos(PHS) - 4\cos(\beta + PHS) + \\ \cos(2\beta + PHS) - 2\beta\sin(PHS)\end{matrix}\right\} -$$

$$(\pi/2)\sum_{m=1}^{3} a_m * \sin(PHS) - (a_4/8) *$$

$$\left\{\begin{matrix}3\cos(PHS) + 4\cos(\beta + PHS) + \\ \cos(2\beta + PHS) - 2\beta\sin(PHS)\end{matrix}\right\}$$

$$B = \int_0^{10\pi} Ir * Sb d\theta_p$$

$$= (a_0/2)[\sin\theta_p + (1/2)\theta_p\cos(PHS) + (1/2)\sin(2\theta_p + PHS)]_{\pi-PHS-\beta}^{\pi-PHS} +$$

$$(1/2)\sum_{m=1}^{3} a_m \left[\begin{matrix}\sin\theta_p + (1/2)\theta_p\cos(PHS) + \\ (1/2)\sin(2\theta_p + PHS)\end{matrix}\right]_{\pi-PHS}^{3\pi-PHS} +$$

$$(a_4/2)[\sin\theta_p + (1/2)\theta_p\cos(PHS) + (1/2)\sin(2\theta_p + PHS)]_{7\pi-PHS}^{9\pi-PHS-\beta}$$

$$= (a_o/8)\{2\beta\cos(PHS) + 3\sin(PHS) - 4\sin(\beta + PHS) + \sin(2\beta + \varphi)\} +$$

$$(\pi/2)\sum_{m=1}^{3} a_m * \sin(PHS) -$$

$$(a_4/8)\left\{\begin{matrix}-2(\pi - \beta)\cos(PHS) + 3\sin(PHS) + \\ 4\sin(\beta + PHS) + \sin(2\beta + \varphi)\end{matrix}\right\}$$

Figure 6:
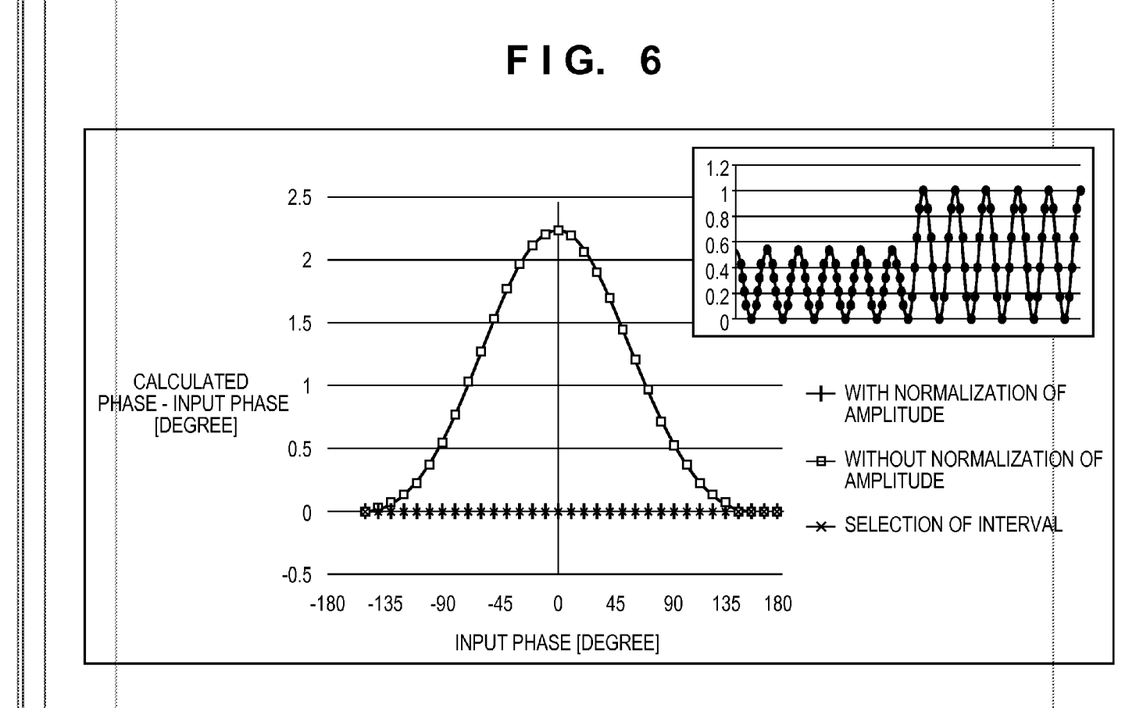
FIG. 6 is a graph showing phase calculation accuracy according to Example 1.

A maximum value of β is estimated as "2π/division number of one period of density signal/2" in a phase. In this embodiment, since the periodic pattern signal is divided into 12 parts, an error up to β=2π/12/2=15° occurs. FIG. 6 shows the calculation accuracy of the phase information calculated under the condition according to the embodiment. A state shown in the upper right portion of FIG. 6 indicates a state with a phase of 0°, and the absolute code is 00000111111. A maximum error in this embodiment is 0.01° which corresponds to accuracy of a division number of 5000 whole a maximum error is 2.23° when the amplitude is not normalized. As the division number increases, the calculation accuracy improves. It is, therefore, only necessary to optimize the division number according to the required accuracy and the period of a harmonic wave. Furthermore, as the number of waves of the periodic pattern signal is larger, the accuracy improves. It is, therefore, only necessary to select the region RNGA so that the number of periodic pattern signals included in the data Is becomes largest.

EXAMPLE 2

Figure 7:
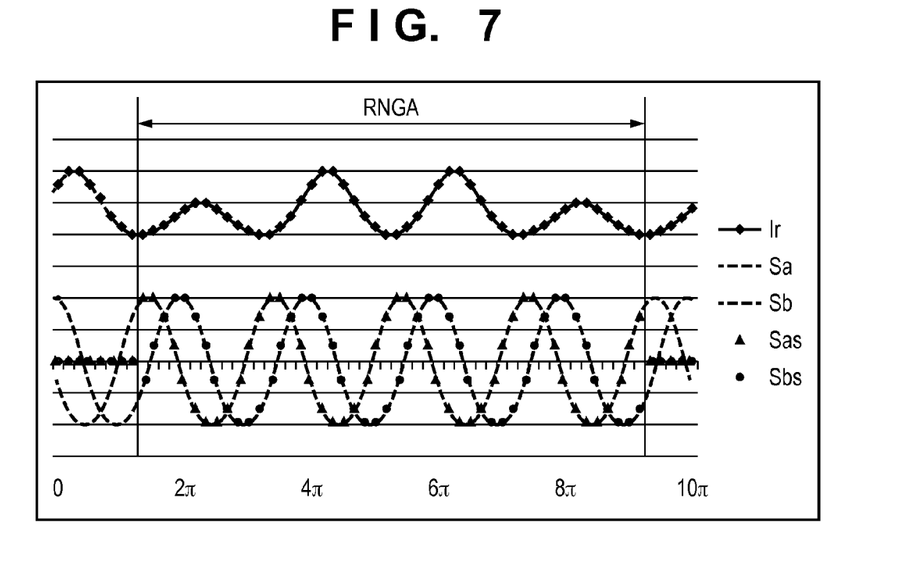
FIG. 7 is a graph showing data selection according to Example 2.

Example 2 will be described below. The arrangement of an apparatus and processing up to a process of determining a region RNGA may be the same as those in Example 1 and a description thereof will be omitted. In Example 2, data of first reference waveform data Sa and second reference waveform data Sb, which correspond to the region RNGA, are held intact, and the remaining data are set to 0, thereby setting the thus obtained data as first reference waveform data Sas and second reference waveform data Sbs, respectively (FIG. 7). It is possible to obtain total sums A and B without unnecessary terms as in Example 1 by multiplying a periodic pattern signal Ir by the modified first reference waveform data Sas and second reference waveform data Sbs and adding the results, respectively, and to calculate the phase information PHS by arc tangent calculation.

EXAMPLE 3

Figure 8:
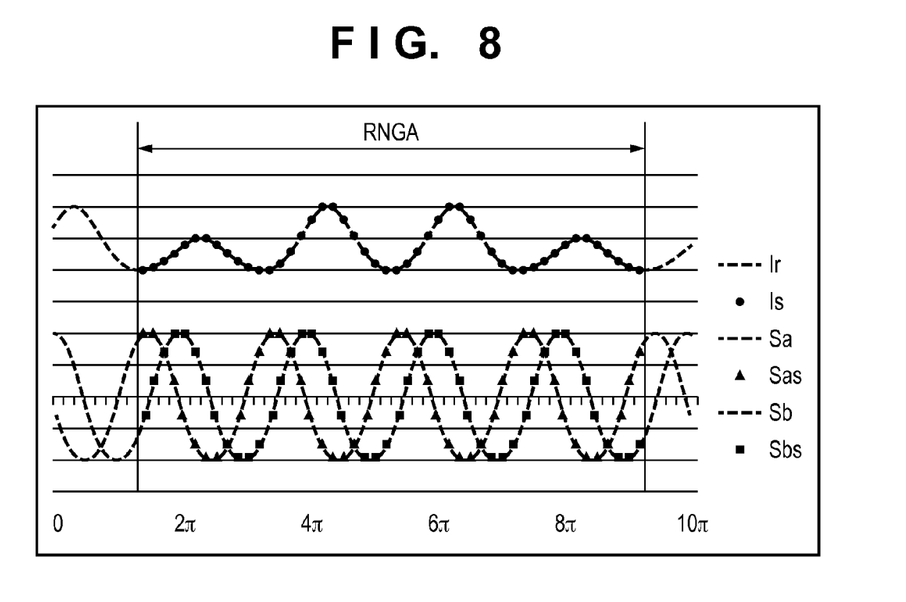
FIG. 8 is a graph showing data selection according to Example 3.

Example 3 will be described below. The arrangement of an apparatus and processing up to a process of determining a region RNGA are the same as those in Example 1 and a description thereof will be omitted. In Example 3, only data of the region RNGA of a periodic pattern signal Ir are held as new data Is (FIG. 8). As for reference waveform data, only the data of the region RNGA of the reference waveform data Sa and Sb in Example 1 are held as first reference waveform data Sas and second reference waveform data Sbs, respectively. It is possible to obtain total sums A and B without unnecessary terms as in Example 1 by multiplying the data Is by the data Sas and Sbs and integrating the results, respectively, and to calculate phase information PHS by arc tangent calculation. Since the amount of the data Is and reference waveform data reduces, the processing time shortens, as compared with Example 1.

EXAMPLE 4

Figure 9:
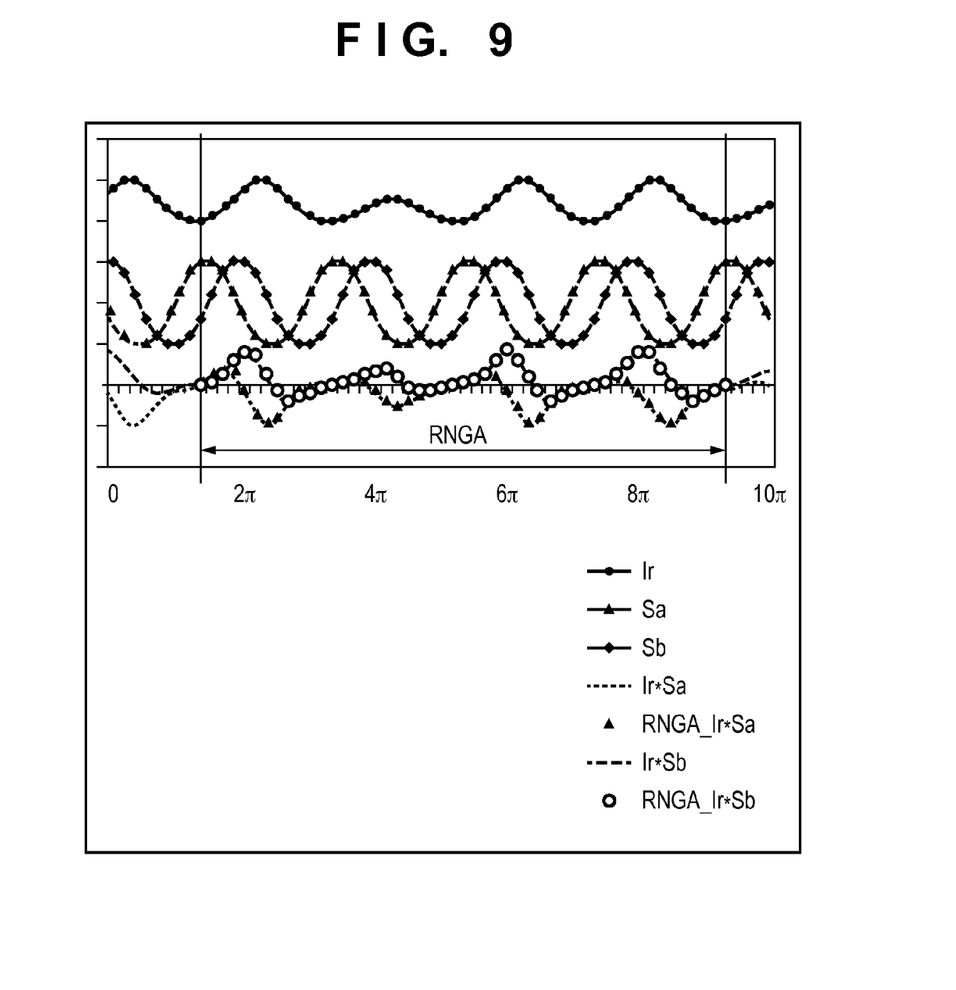
FIG. 9 is a graph showing data selection according to Example 4.

Example 4 will be described below. The arrangement of an apparatus and processing up to a process of determining a region RNGA are the same as those in Example 1 and a description thereof will be omitted. In Example 4, based on the results of multiplying a periodic pattern signal Ir by first reference waveform data Sa and second reference waveform data Sb, respectively, the total sums are calculated using only data (indicated by open circles and open triangles shown in FIG. 9) corresponding to the region RNGA. It is possible to obtain total sums A and B without unnecessary terms as in Example 1, and to calculate phase information PHS by arc tangent calculation.

EXAMPLE 5

Figure 10A:
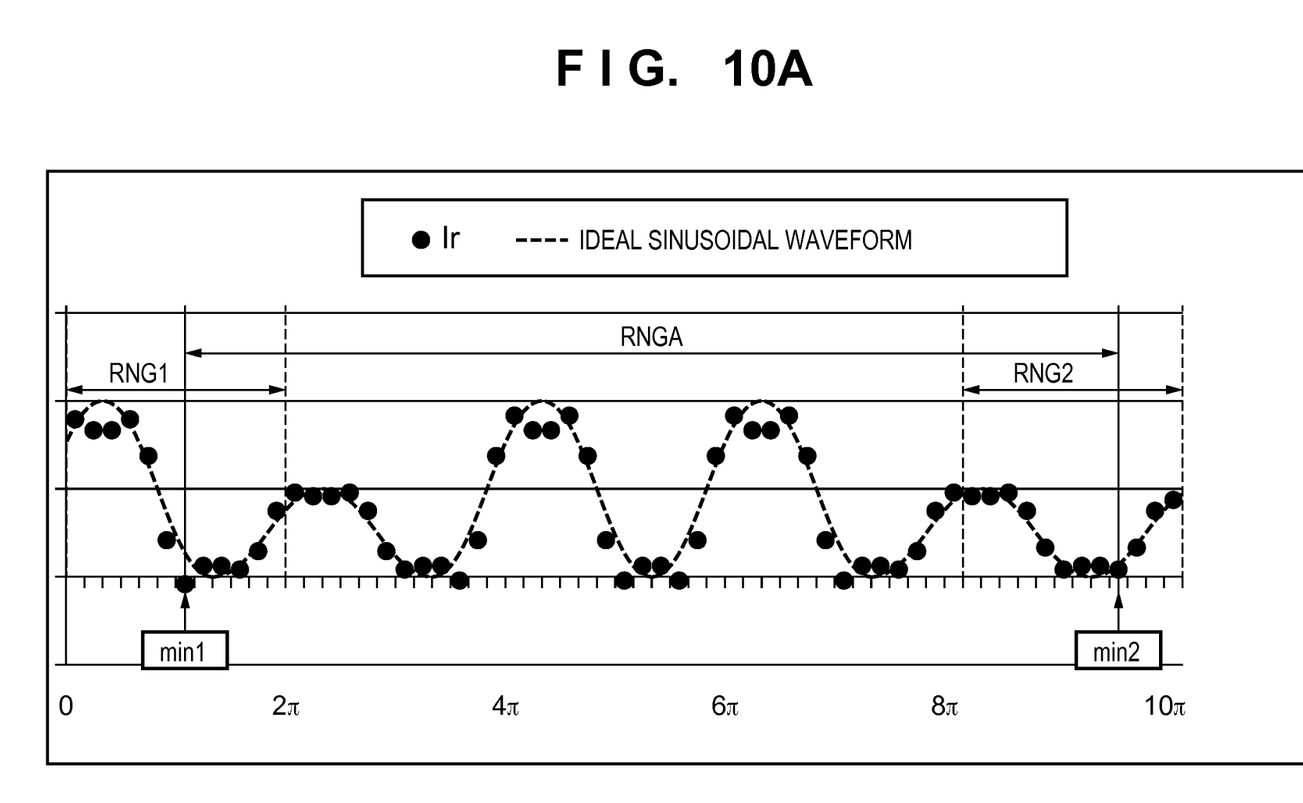
FIGS. 10A, 10B, and 10C are graphs each showing data selection according to Example 5.

Example 5 will be described below. The arrangement of an apparatus may be the same as that in Example 1 and a description thereof will be omitted. A case in which the density periodic pattern signal is an ideal sinusoidal signal has been exemplified above. In fact, however, it is impossible to obtain an ideal sinusoidal light amount distribution due to diffracted light, noise, or soil of a grating. Data Ir represented by solid circles shown in FIG. 10A indicate a case in which a harmonic wave having a period three times longer than that of the density periodic pattern signal exists. If positions min1 and min2 of local minimum points of the modulation information are simply determined based on the amount of light as described in Example 1, shifts between these determined positions and the actual positions of the local minimum points of the modulation information occur. Consequently, the range of a region RNGA no longer corresponds to data of i periods (i is 1 or larger), thereby causing an error in calculated phase information. To avoid such error, it is possible to calculate the positions of the local minimum points of the modulation information, as follows.

Figure 10B:
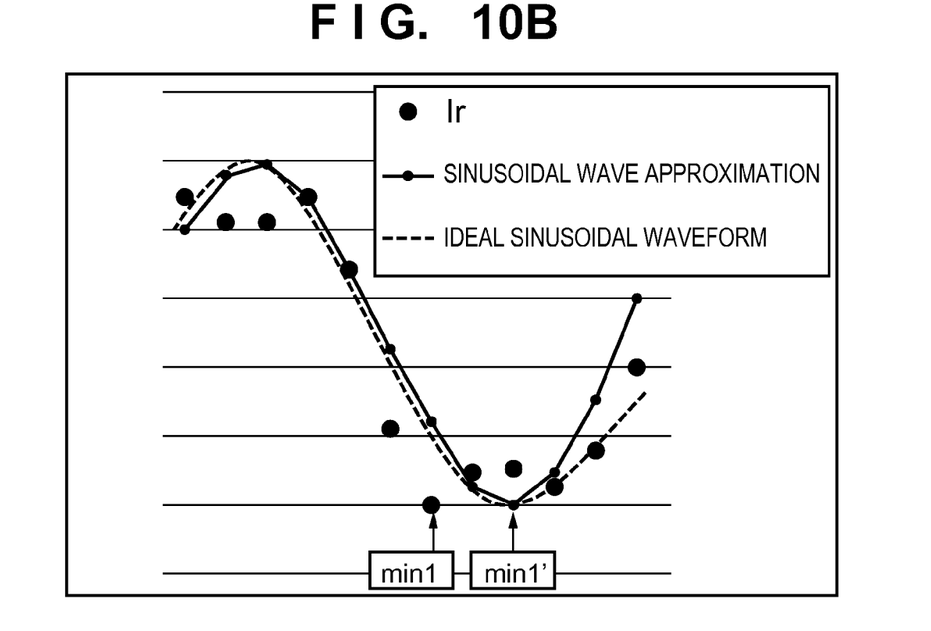

In regions RNG1 and RNG2, positions min1' and min2' of local minimum points of the modulation information may be determined by approximating data to a sinusoidal waveform having a period coinciding with that of the density signal using the least squares method. Referring to FIG. 10B, solid circles indicate the data Ir, a solid line indicates the data approximated to the sinusoidal waveform, and a broken line indicates ideal sinusoidal waveform data. It is apparent that the position min1' of the local minimum point of the modulation information, which has been determined by approximating the data to the sinusoidal waveform, is closer to the position of the local minimum point of the modulation information of the ideal sinusoidal waveform than the position min1 determined based on the minimum value of the data Ir within the region RNG1. It is always possible to calculate the position of the local minimum point of the modulation information only if the range of each of the regions RNG1 and RNG2 corresponds to one or more periods of the density signal. The position of the local minimum point of the modulation information may be calculated by approximating the data to another appropriate function.

Figure 10C:
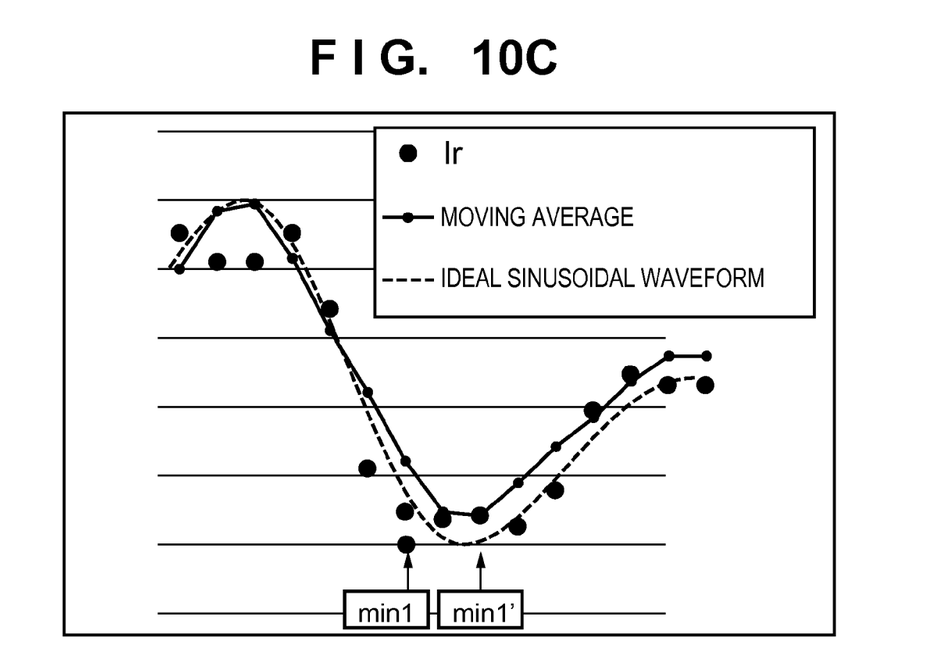

As another example, a waveform is smoothed by obtaining the moving average of adjacent data in the region RNG1 or RNG2 where the position of a local minimum point is calculated, and the position min1' or min2' of the local minimum point of the modulation information is obtained. Referring to FIG. 10C, solid circles indicate the data Ir, a solid line indicates data having undergone the moving-average processing, and a broken line indicates ideal sinusoidal waveform data. The position min1' of the local minimum point of the modulation information, which has been determined after the moving-average processing, is closer to the position of the local minimum point of the modulation information of the ideal sinusoidal waveform than the position min1 determined based on the minimum value of the data Ir within the region RNG1. In this case, it is only necessary to optimize the number of adjacent data to undergo the moving-average processing according to a light amount distribution, and determine the ranges of the regions RNG1 and RNG2 so that the data having undergone the moving-average processing always include the local minimum points of the modulation information.

Other Embodiments

The present invention is not limited to the aforementioned embodiment, and various changes and modifications can be made within the spirit and scope of the present invention, as follows.

Figure 11A:
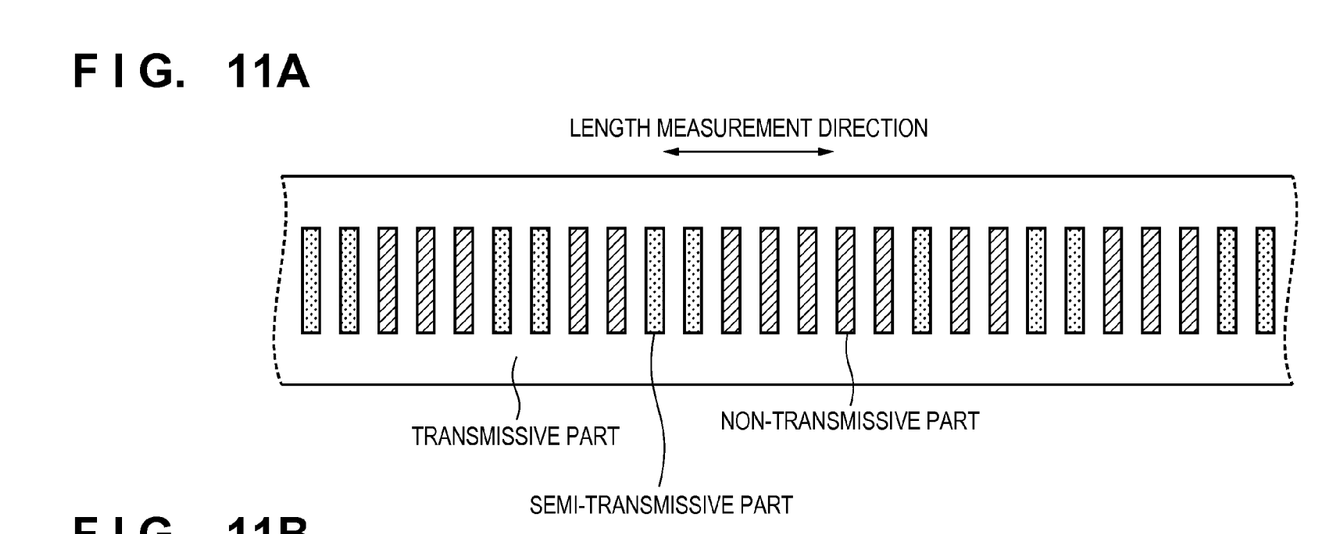
FIGS. 11A and 11B are views showing a transmissive scale and its periodic signal according to the second embodiment, respectively.
Figure 11B:
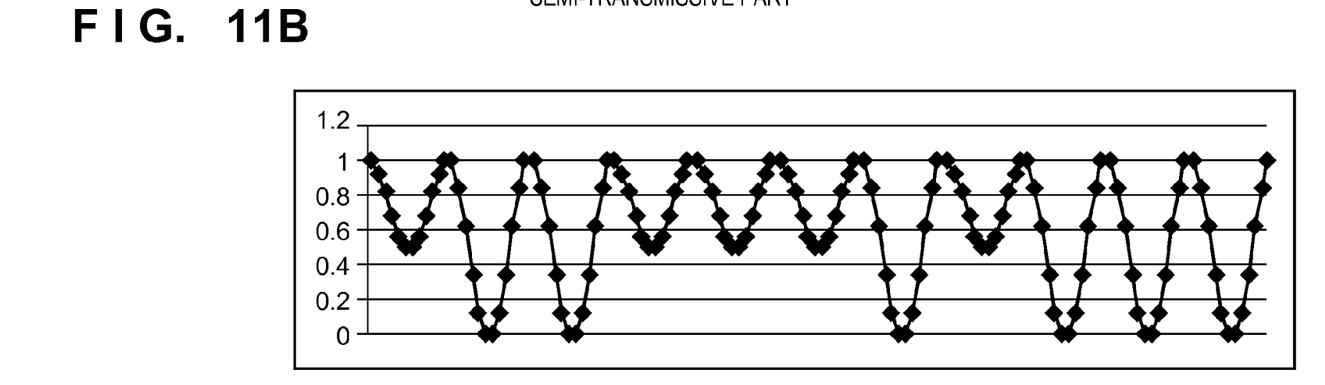

The present invention is applied to an encoder having a scale in which transmissive gratings are arranged at equal intervals, as shown in FIG. 11A. In this case, a light amount distribution is obtained by turning the waveform GRPHO upside down, as shown in FIG. 11B. The local minimum values of the modulation information correspond to a transmissive portion (the amount of light is maximum). The integration range corresponds to a data range of i periods including the overall waveform within a region between the positions of local maximum points of the periodic pattern signal Ir (modulation information) with all periods obtained from the light-receiving elements. In this case, the positions of the local maximum points of the modulation information indicate the center positions of scale board parts (transmissive parts) between the semi-transmissive parts and non-transmissive parts of a periodic pattern formed on a scale board. A local maximum value is an extreme value which appears as a constant value for each period of the periodic pattern formed by the transmissive parts and semi-transmissive parts in the periodic pattern signal Ir with all periods.

The present invention is applied to an encoder with a reflective scale. In this case, three types of gratings including a reflective grating, partially reflective grating, and non-reflective grating are used as gratings on the scale. Non-reflective gratings may be arrayed at equal intervals, and partially reflective gratings or reflective gratings may be inserted between the non-reflective gratings, thereby embedding absolute codes. Alternatively, reflective gratings may be arrayed at equal intervals, and partially reflective gratings or non-reflective gratings may be inserted between the reflective gratings, thereby embedding absolute codes.

The present invention is applied to an encoder with an arbitrary gray-level scale which allows discrimination between two or more values.

One "bright-dark" cycle of the light-receiving element array PDA is changed among three, four, six, or eight elements.

Equations/values used for calculation in the above embodiment are changed, as needed, in consideration of sensitivity variations of the respective cells of the light-receiving element array and an uneven light amount due to an optical system. An approximation value may be applied depending on the required accuracy.

The same function as that of the single processing unit CULC shown in FIG. 1 is implemented by another algorithm or procedure. A method of performing addition/subtraction/multiplication processing for signals from the light-receiving element array using parallel analog circuits, a method of performing addition/subtraction/multiplication processing or filter processing for signals from the light-receiving element array using serial analog circuits, and a method of immediately A/D-converting signals of the light-receiving element array, and performing calculation processing for the converted signals as digital information using, for example, an FPGA may be used.

An encoder optical system is changed to another optical system such as an enlarging illumination optical system using diverging light or an imaging optical system using a lens.

A measurement apparatus such as a Michelson interferometer which calculates a phase based on waveform data with high accuracy is used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-251501 filed Nov. 15, 2012, which is hereby incorporated by reference herein in its entirety.

What is claimed is:

1. A measurement apparatus of measuring a position of a target object, the apparatus comprising:
a detector configured to detect modulated light from the target object having a periodic pattern, and to output a periodic pattern signal with at least two periods; and
a calculation unit configured to calculate the position of the target object based on the output of said detector,
wherein said calculation unit
determines positions of two extreme values each of which appears as a constant value for each period of the periodic pattern from the periodic pattern signal output from said detector,
calculates a first total sum by multiplying the periodic pattern signal by first reference waveform data of a sinusoidal waveform with the same period as that of the periodic pattern signal in a region between the positions of the two extreme values, and adding the multiplication results,
calculates a second total sum by multiplying the periodic pattern signal by second reference waveform data of a sinusoidal waveform with a phase difference of 90° with respect to the first reference waveform data in the region, and adding the multiplication results,
calculates a phase of the periodic pattern signal based on the first total sum and the second total sum, and
calculates the position of the target object based on the calculated phase.

2. The apparatus according to claim 1, wherein
the periodic pattern signal output from said detector indicates discrete data, and
said calculation unit smoothes the discrete data by obtaining a moving average of each of the discrete data and the previous and the next discrete data in each of a first region including one of the two extreme values of the discrete data and a second region including the other of the two extreme values, and then determines positions of extreme values of the smoothed discrete data as the positions of the extreme values of the periodic pattern signal.

3. The apparatus according to claim 1, wherein
the periodic pattern signal output from said detector indicates discrete data, and
said calculation unit approximates each of the discrete data to a sinusoidal waveform in each of a first region including one of the two extreme values of the discrete data and a second region including the other of the two extreme values, and then determines positions of extreme values of the approximated sinusoidal waveform as the positions of the extreme values of the periodic pattern signal.

4. The apparatus according to claim 1, wherein
said calculation unit determines a position distant from the position of one of the two extreme values by i periods (i is a natural number) as the position of the other of the two extreme values.

5. An absolute encoder, the encoder comprising:
a scale in which a plurality of marks including at least two different types of marks are arrayed at a constant period in a first direction; and
a measurement apparatus configured to measure a position ofsaid scale ,
the measurement apparatus comprising:

a detector configured to detect modulated light from at least two of the plurality of marks, and to output a periodic pattern signal with at least two periods; and a calculation unit configured to calculate an absolute position of said scale in the first direction with respect to said detector based on the output of said detector, wherein said calculation unit determines positions of two extreme values each of which appears as a constant value for each period of the periodic pattern from the periodic pattern signal output from said detector, calculates a first total sum by multiplying the periodic pattern signal by first reference waveform data of a sinusoidal waveform with the same period as that of the periodic pattern signal in a region between the positions of the two extreme values, and adding the multiplication results, calculates a second total sum by multiplying the periodic pattern signal by second reference waveform data of a sinusoidal waveform with a phase difference of 90° with respect to the first reference waveform data in the region, and adding the multiplication results, calculates a phase of the periodic pattern signal based on the first total sum and the second total sum, and calculates the absolute position of said scale in the first direction based on the calculated phase.

6. A measurement method of measuring a position of a target object, the method comprising:

detecting a modulated light from the target object having a periodic pattern, and obtaining a periodic pattern signal with at least two periods;

determining positions of two extreme values each of which appears as a constant value for each period of the periodic pattern for the obtained periodic pattern signal;

calculating a first total sum by multiplying the periodic pattern signal by first reference waveform data of a sinusoidal waveform with the same period as that of the periodic pattern signal in a region between the positions of the two extreme values, and adding the multiplication results;

calculating a second total sum by multiplying the periodic pattern signal by second reference waveform data of a sinusoidal waveform with a phase difference of 90° with respect to the first reference waveform data in the region, and adding the multiplication results;

calculating a phase of the periodic pattern signal based on the first total sum and the second total sum; and calculating the position of the target object based on the calculated phase.

\* \* \* \* \*